(12) United States Patent
Pearson

(10) Patent No.: US 6,454,281 B1
(45) Date of Patent: Sep. 24, 2002

(54) BUCKET TRUCK

(76) Inventor: Stan Pearson, 9522 Lampson Ave., Garden Grove, CA (US) 92683

( * ) Notice: Subject to any disclaimer, the term of this patent is extended or adjusted under 35 U.S.C. 154(b) by 0 days.

(21) Appl. No.: 09/490,430

(22) Filed: Jan. 24, 2000

(51) Int. Cl.⁷ .................................................. B62B 1/26
(52) U.S. Cl. ................................... 280/47.26; 280/79.5
(58) Field of Search ........................ 280/35, 638, 651, 280/652, 655, 47.17, 47.19, 47.24, 47.26, 47.28, 47.29, 79.5

(56) References Cited

U.S. PATENT DOCUMENTS

| | | | | |
|---|---|---|---|---|
| 2,422,298 A | * | 6/1947 | Freis | 280/47.26 |
| 2,930,561 A | * | 3/1960 | Bittle | 280/47.26 |
| 4,062,564 A | * | 12/1977 | Schimmeyer | 280/652 |
| 4,114,915 A | * | 9/1978 | Lello et al. | 280/47.19 |
| 4,753,445 A | * | 6/1988 | Ferrare | 280/47.17 |
| 4,822,065 A | * | 4/1989 | Enders | 280/652 |
| 5,071,148 A | * | 12/1991 | Salvucci, Sr. | 280/47.26 |
| 5,209,517 A | * | 5/1993 | Shagoury | 280/47.26 |
| 5,433,463 A | * | 7/1995 | Finley | 280/79.5 |
| 5,586,778 A | * | 12/1996 | Lindh et al. | 280/655 |
| 5,626,351 A | * | 5/1997 | Tsai | 280/655 |
| 5,820,146 A | * | 10/1998 | Van Ligten | 280/47.19 |
| 5,860,659 A | * | 1/1999 | Hart | 280/79.5 |
| 6,053,516 A | * | 4/2000 | Ottaway | 280/79.5 |

FOREIGN PATENT DOCUMENTS

| | | | | |
|---|---|---|---|---|
| DE | 3544458 | * | 7/1986 | 280/47.24 |
| DE | 3936099 | * | 5/1991 | 280/47.26 |
| GB | 2244683 | * | 12/1991 | 280/79.5 |
| SE | 161033 | * | 10/1957 | 280/47.19 |
| SU | 1650509 | * | 5/1991 | 280/655 |

* cited by examiner

*Primary Examiner*—Frank Vanaman
(74) *Attorney, Agent, or Firm*—Cleveland R. Williams, II

(57) ABSTRACT

A utility tool cart that is especially designed for carrying tools and equipment around work environments such as construction sites. The utility tool cart is a hand cart that is particularly adapted to carry equipment over long distances and/or difficult terrain. The utility tool cart contains a pair of wheels near the bottom thereof, a first support unit for holding a first tool container, a second support unit for holding a second tool container and a telescoping shaft having a hand grip.

18 Claims, 3 Drawing Sheets

BUCKET TRUCK

BACKGROUND OF THE INVENTION

1. Field of the Invention

This invention relates to a utility tool cart for carrying various tools and equipment around work environments such as construction sites and the like, and more specifically to a hand cart having specialized equipment which is particularly adapted to carry equipment over long distances and/or difficult terrain.

Conventional utility carts used to transport various items are usually cumbersome and unwieldy to handle, so that there is a need to provide a cart which is strong enough to carry heavy tools and at the same time combine sturdy support, high maneuverability and a design that is capable of traversing rough terrain, for example, a construction site.

2. Description of the Prior Art

Various utility carts have been used in the past to transport a variety of items, such as tools and other objects.

For example, U.S. Pat. No. 5,713,583 to Hansen relates to a utility cart for concrete finishing operations. In particular the Patent teaches utility carts for transporting tools and other supplies that a worker or individual can pull as he or she works. The cart consists of an elongated open frame supported between a pair of tires. The frame comprises a pair of longitudinal side bars and a transverse bar. A bucket or container is suspended between the wheel axle and upper free ends of a generally U-shaped support. A handle extends from the transverse bar at the end of the open frame opposite the bucket or container. The bucket or container is used to store tools.

U.S. Pat. No. 5,340,135 to Womberly discloses a hand truck for carrying or transporting fishing equipment. The hand truck consists of a frame formed of a laterally spaced apart elongate left, central and right upright frame member wherein each upright frame member is secured together by a spaced apart first, second and third lateral crossmember. A load support platform extends between right and left upright frame members and a truck handle extends between said right and left upright frame members. An axle containing tires is disposed behind said upright frame members and adjacent said right and left frame members at a lower end thereof. The hand truck is used to transport fishing rods and containers for carrying fishing equipment.

U.S. Pat. No. 5,692,761 to Havlovitz relates to a utility cart. The cart consists of a large bucket-like utility cart having two pairs of wheels for allowing the cart to be tilted in both forward and backward directions utilizing a collapsible loop handle with an angled crossbar design. The loop like handle has spaced apart leg members connected to an open ended receptacle and a crossbar connecting said leg members. The cart can also contain foot operated brake means.

U.S. Pat. No. 5,316,248 to Allen teaches a hand actuated bucket pourer. The bucket pourer consists of a base structure and an upright support structure extending upwardly from the base. A bucket holder is pivotally mounted within the upright support structure. A handle extends upwardly from the bucket holder. The bucket pourer consists of a base support structure for sitting on the ground or other support surface. The base support structure includes a pair of laterally spaced side frames containing a series of cross members connected between the side frames. A bucket support structure is pivotally mounted between upright members that extend upwardly from converging junctions of the side frames. A handle is secured to the bucket support structure and extending therefrom for pivoting said bucket support structure.

U.S. Pat. No. 4,357,029 to Marini et al. relates to a utility cart that is particularly adapted for transporting trash cans. The cart consists of substantially U-shaped side structures which are joined together at the bottoms by a rear crossbar and a front axle which also functions as a support for trash cans. Rear upwardly extending legs of the rear U-shaped side structure form the cart handles. A substantially rectangularly shaped frame joins the upper ends of the U-shaped side structure and acts as a retainer for holding trash cans in place.

U.S. Pat. No. 4,187,950 to Peet discloses a gas can transporter for liquid containers. The transporter consists of a wheeled frame for supporting gas cans utilizing pivotal attachments to a plurality of frontal bars which project outwardly from a vertical brace. The frontal bars define a pair of storage areas or compartments for holding gas cans. A vertical brace includes an axle for supporting a pair of main wheels, while pivotal front wheels are provided on cantilevered ends of the frontal bars for increased maneuverability.

As can readily be determined from the foregoing, there is an ongoing research effort and a need to develop and produce new and novel utility carts for transporting tools and the like.

SUMMARY OF THE INVENTION

The present invention resides in a utility cart for tools that allows an individual to easily transport tools over difficult terrain such as that found on a construction site. The utility cart comprises an elongated base support that is rectangular in configuration and has a first circular support unit containing a raised circular lip attached to the front of said base support. The circular support unit has a first elongated, rectangular shaped structure extending along the bottom radius and attached to the bottom of said first circular support unit. A second elongated, rectangular shaped structure extends along the bottom radius and attached to the bottom of the first circular support at a 90 degree angle to the first elongated, rectangular shaped structure. A first hollow, elongated rectangular shaft is attached to the rear of the elongated base structure in a centered, upright position. The first hollow shaft contains an axle which passes through it and is attached thereto. The axle contains a pair of tires that provide moveable support for the base support. A second hollow, elongated rectangular shaped shaft slideably fits into the first hollow shaft and is held in position by a quick release pin which passes though centered and matching holes in opposite sides of the first and second shafts. A second circular support unit containing a raised circular lip is attached to a short, elongated hollow shaft having a rectangular configuration. The second circular support contains first and second elongated, rectangular shaped structures at a 90 degree angle to each other, extending along bottom radii of the second circular support. The short, hollow shaft slideably fits around the outside of the second hollow shaft and is locked into place with a quick release pin. A third elongated, rectangular shaped hollow shaft is slideably positioned in the second hollow shaft with telescoping means and is locked into position with a quick release pin. The third shaft is angled near the top and contains a handle bar grip. The first and second circular support units are particularly designed to receive circular containers which store tools.

BRIEF DESCRIPTION OF THE DRAWINGS

The invention is more readily described by the following drawings where.

DETAILED DESCRIPTION OF THE INVENTION

Figure 1:
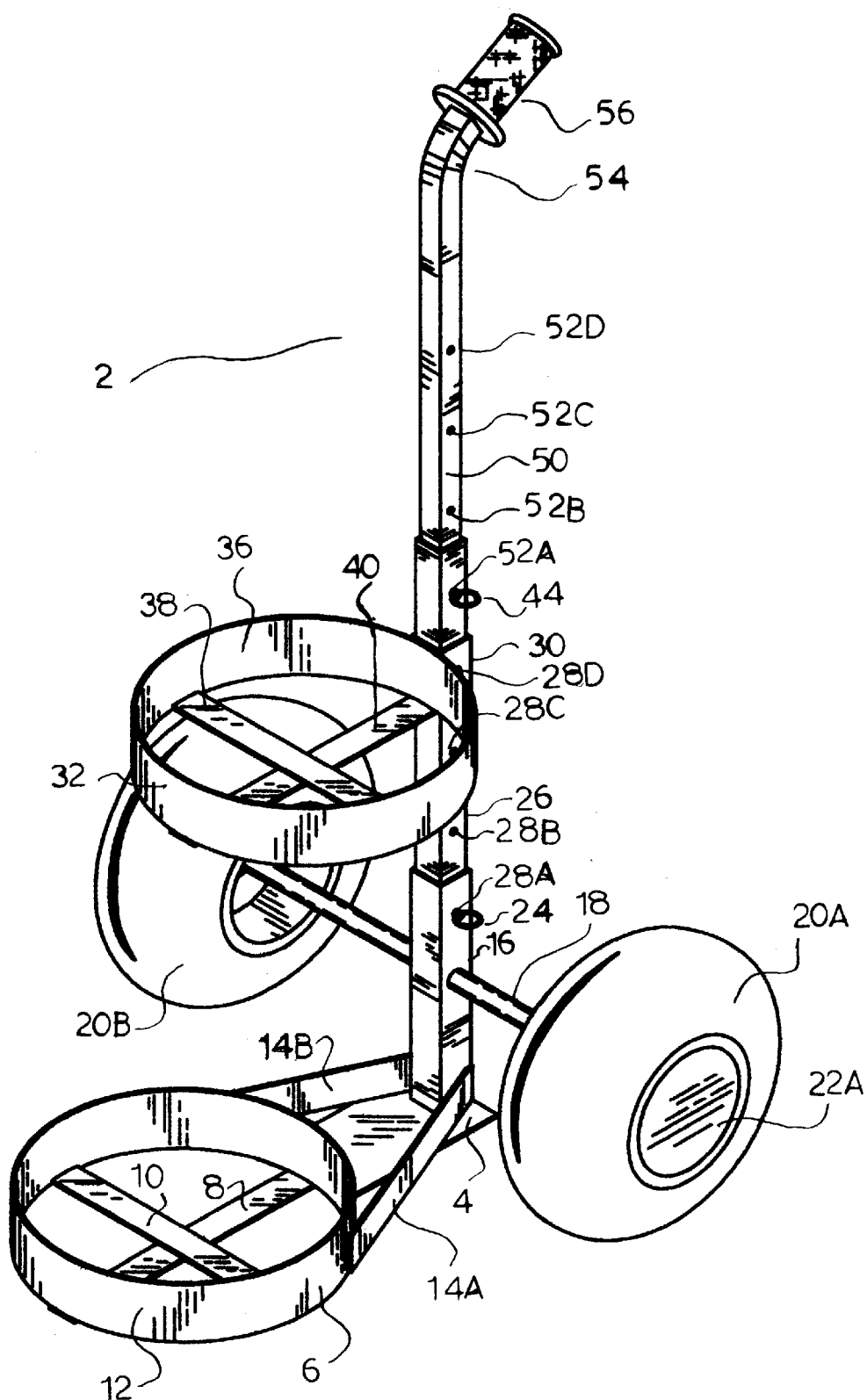
FIG. 1 is a frontal perspective drawing of the bucket truck, utility cart herein.

The present invention resides in a bucket truck, utility cart for transporting tools over long distances or difficult terrain.

Embodiments of the utility cart of the present invention are hereinafter described with reference to the drawings, in which identical or corresponding parts are indicated by the same reference characters or numbers through the several views.

FIG. 1 illustrates a front perspective view of bucket truck, utility cart 2 which comprises elongated base support structure 4 that has a rectangular configuration. Base support 4, has a top, bottom, right and left sides, a front and back or rear sections. Preferably, base support 4 is constructed from a solid piece of metal. Base support structure 4 has first circular support unit 6 containing raised circular lip 12 attached to the front of said base support structure 4. First circular support unit 6 has an open top and a bottom and contains a first elongated, rectangular shaped structure 8 extending along the bottom radius thereof. A second elongated, rectangular shaped structure 10 extends along the bottom radius of the first circular support unit 6 at a 90 degree angle to first rectangular shaped structure 8. The first 8 and second 10 rectangular shaped structures are attached to the bottom of first circular support unit 6.

A first hollow, elongated rectangular shaped shaft 16 is attached to the top, back or rear section of base support structure 4 in an upright, centered position. First hollow shaft 16 contains circular axle 18 which passes through a hole in first hollow shaft 16 and is secured thereto, for example, by welding. Axle 18 contains a pair of support tires (20A and 20B) which movably support utility cart 2. Axle 18 also contains ball bearings (not shown) and axle caps 22A and 22B (not shown) which give the wheel a pleasing appearance. Tires 20A and 20B can be either solid rubber, plastic or pneumatic tires. The preferred tire is pneumatic or air inflated rubber tires. Matching holes 24 are drilled in first hollow shaft 16 parallel to each other. A pair of slide support struts 14A and 14B are attached to the bottom sides of first hollow shaft 16 and to the outside lip 12 of first circular support unit 6 in a V-shaped configuration.

A second hollow, elongated rectangular shaped shaft 26 is slideably positioned inside of first hollow shaft 16 and is held in place by quick release pin 24 which passes through matching holes drilled into said first shaft 16 and second shaft 26 which are parallel to and opposite each other. Second hollow shaft 26 contains matching drilled holes 28 (A, B, C and D) which are spaced apart and parallel to each other.

A second circular support unit 32 has an open top and bottom, raised circular lip 36 and contains a first elongated, rectangular shaped structure 40 extending along the bottom radius of said second support unit 32. A second elongated, rectangular shaped structure 38 extends along the bottom radius of second circular support unit at a 90 degree angle to first rectangular structure 40. The first 40 and second 38 rectangular shaped structures are attached to the bottom of second circular support unit 32. Second circular support unit 32 is attached to a short, elongated hollow. shaft 30 at lip 36 of support unit 32. Short, hollow shaft 30 fits around second shaft 26 in either a stationary position or can be moved in a telescoping manner up or down second shaft 26 and be secured utilizing a quick release pin which passes through matching drilled holes in short hollow shaft 30 and second hollow shaft 26, for example holes 28A, 28B, 28C, and 28D which are representative of matching drilled holes. Short hollow shaft 30 will have one set of matching drilled holes, e.g. not shown.

Third hollow, elongated shaft 50 has a rectangular configuration and fits inside of second hollow shaft 26. Matching drilled holes 52A to D in third hollow shaft 50 are spaced apart and parallel to drilled holes on the opposite side of said shaft.

Quick release pin 44 passes through matched drilled hole 28D of second hollow shaft 26 and through matching holes in third hollow shaft 50 and out through a parallel matching hole on the opposite side of second hollow shaft 26. By matching up the various holes drilled in third hollow shaft 50, e.g. 52A to D, the third hollow shaft 50 which forms a handle for utility cart 2, can be moved either up or down in a telescoping motion. Third hollow shaft 50 contains an angle 54 near the top thereof which includes handle bar grip 56.

It is to be noted that utility cart herein may be constructed from metal or a strong plastic such as polyvinyl chloride with metal being the preferred construction material.

Figure 2:
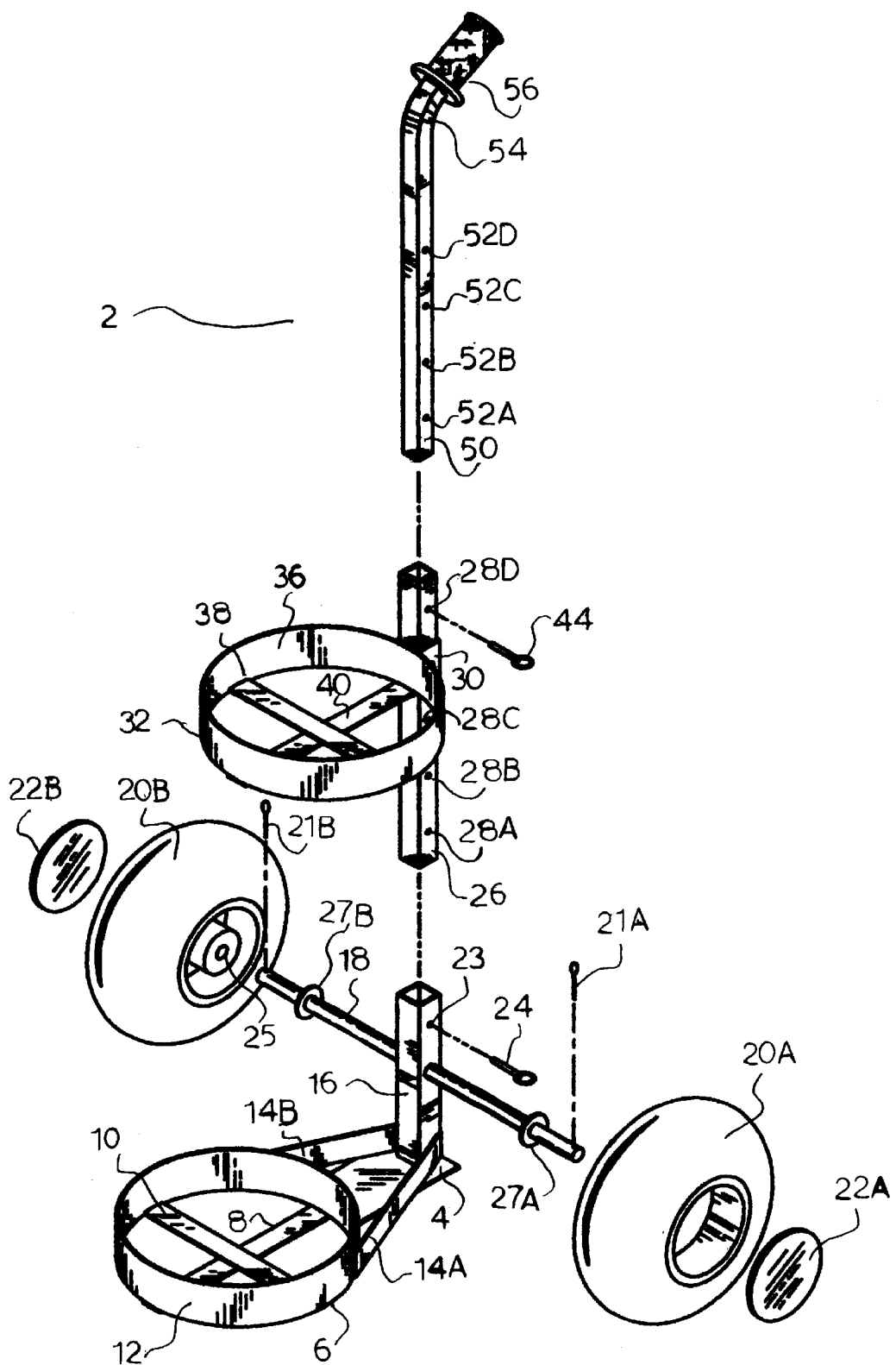
FIG. 2 is a frontal, exploded perspective view of the utility cart shown in FIG. 1

FIG. 2 is an exploded view of utility cart 2 shown in FIG. 1 with the following exceptions:

Circular stops 27A and 27B which are circular lips or ridges on the right and left sections of axle 18 provide for inside stops for wheels 20A and 20B respectively. Cotter pins 21A and 21 B provide outer stops for wheels 20A and 20B. Alternatively, hub caps or axle caps 22A and 22B can be utilized to provide outer stops for wheels 20A and 20B by providing a circular hole that is slightly smaller than the outside diameter of axle 18. Hub caps or axle caps 22A and 22B are forced on the ends of axle 18 using a hammer or similar tool.

As can readily be determined from FIG. 2, second hollow shaft 26 and third hollow shaft 50 can be separated from each other by removing quick release pin 44. Similarly, second hollow shaft 26 and first hollow shaft 16 can be separated by removing quick release pin 24 from matching hole 23. Short hollow shaft 30 can be separated from second hollow shaft 26 by removing a quick release pin (not shown) from matching hole 28D. Alternatively, short hollow shaft 30 can be permanently secured to second hollow shaft 26, for example by welding.

As can readily be determined from the exploded view in FIG. 2, the second hollow shaft 26 and third hollow shaft 50 can be detached from each other and second hollow shaft 26 can be detached from first hollow shaft 16. This allows utility cart 2 to be easily and quickly disassembled and assembled for storage purposes and subsequent use.

It is to be noted that second hollow shaft 26 has a plurality of matched, parallel drilled holes 28A to 28D, preferably from 2 to 6 drilled holes. Third hollow shaft 50 also contains a plurality of matched, parallel drilled holes 52A to 52D, preferably from 2 to 6 drilled holes. By utilizing quick release pin 44, third hollow shaft 50 can be moved either upward or downward inside of second hollow shaft 26 providing for telescoping motion. Third hollow shaft 50 can be secured at a particular height by placing quick release pin 44 through the desired matching, drilled holes in both second and third hollow shafts 26 and 50. Quick release pins 24 and 44 are circular in configuration and have a securing ball unit on one end and a circular pull ring attached to the opposite end.

Figure 3:
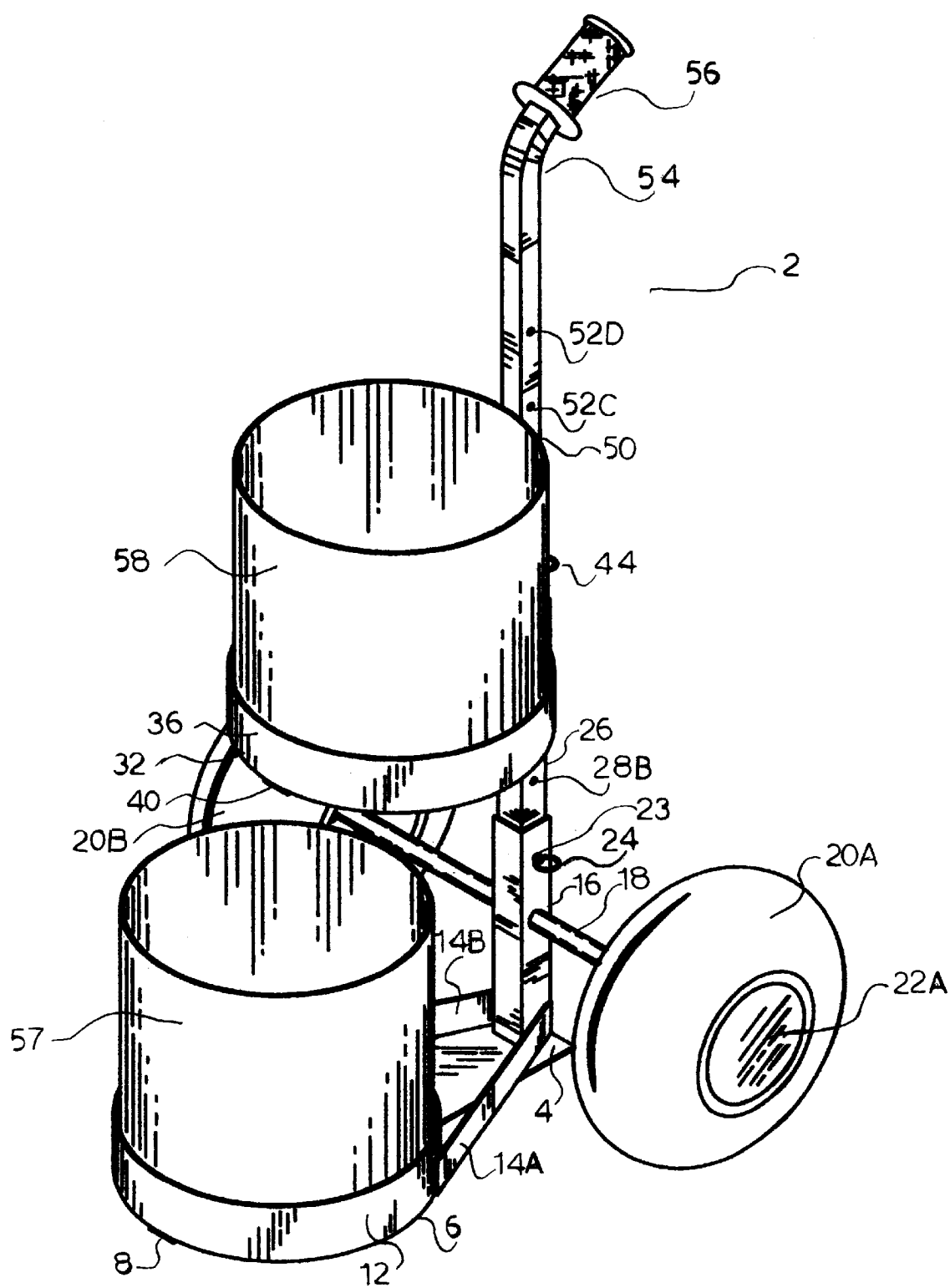
FIG. 3 is another frontal, perspective view of the utility cart shown in FIG. 1, wherein said cart contains circular containers for storing tools.

FIG. 3 is substantially the same as FIG. 2 with the following exceptions: Circular containers 57 and 58 are supported by first circular support unit 6 and second circular support unit 32 and are secured in position by raised circular lip 12 and raised circular lip 36 respectively.

Obviously, many modifications and variations of the invention, as hereinbefore set forth, may be made without departing from the spirit and scope thereof, and therefore, only such limitations should be imposed as are indicated in the appended claims.

What is claimed is:

1. A utility cart adapted for use in transporting tools, said cart comprising: An elongated base support structure having a rectangular configuration, a top, a bottom, a front and a back, a first circular support unit having an open top, a bottom and containing a raised circular lip is attached to the front of the rectangular shaped, base support structure, a first hollow, elongated rectangular shaped shaft is attached to the top, near the back of the base support structure in a centered, upright position, a pair of side support struts are attached to opposing bottom sides of the first hollow shaft and the outside of the raised circular lip of the first circular support unit in a V-shaped configuration, an axle supporting a pair of support tires passes through the first hollow shaft and is attached thereto, matching drilled holes are located in opposite sides of the first hollow shaft parallel to each other, a second hollow, elongated rectangular shaft is slidably positioned inside the first hollow shaft, wherein the second hollow shaft contains a plurality of matching drilled holes, spaced apart and on opposite sides thereof parallel to each other, a second circular support unit having a raised circular lip, an open top and a bottom is attached to a short, elongated hollow shaft which fits around the outside of the second hollow shaft and is attached to the second hollow shaft; and a third hollow, elongated rectangular shaped shaft having an angled top section is slidably positioned inside the second hollow shaft wherein the third hollow shaft contains a plurality of matching, drilled holes spaced apart and on opposite sides thereof and parallel to each other.

2. The utility cart of claim 1, wherein the first circular support unit contains a first elongated, rectangular shaped structure extending along a bottom radius of said first unit and is attached thereto.

3. The utility cart of claim 2, wherein the first circular support unit contains a second elongated, rectangular shaped structure extending along a bottom radius of the first circular support unit at a 90 degree angle to the first rectangular shaped structure and is attached to the first circular support unit.

4. The utility cart of claim 1, wherein the axle contains matching inside wheel stops and matching outside wheel stops.

5. The utility cart of claim 4, wherein the inside wheel stops comprise matching pairs of circular ridges and the outside stops comprise a pair of axle caps that fit snugly around the ends of said axle.

6. The utility cart of claim 4, wherein the matching outside wheel stops comprise cotter pins.

7. The utility cart of claim 1, wherein the second hollow, rectangular shaped shaft is releasably attached to the first hollow, rectangular shaped shaft using a quick release pin.

8. The utility cart of claim 1, wherein second circular support unit contains a first elongated, rectangular shaped structure extending along a bottom radius of said second unit and is attached thereto.

9. The utility cart of claim 8, wherein the second circular support unit contains a second elongated, rectangular shaped structure extending along a bottom radius of the second circular unit at a 90 degree angle to the first rectangular shaped structure and is attached to the second circular support unit.

10. The utility cart of claim 1, wherein the plurality of matching drilled holes the in second hollow shaft comprises from 2 to 6.

11. The utility cart of claim 1, wherein the short elongated, hollow shaft is permanently attached to the second hollow, elongated, rectangular shaped shaft.

12. The utility cart of claim 1, wherein the short elongated, hollow shaft is releasably attached to the second hollow elongated, rectangular shaped shaft by a quick release pin.

13. The utility cart of claim 1, wherein the plurality of matching drilled holes in the third hollow shaft comprise from 2 to 6.

14. The utility cart of claim 1, wherein the top of the third, hollow shaft has a downward angle.

15. The utility cart of claim 1, wherein the third hollow shaft has a handle bar grip at the top thereof.

16. The utility cart of claim 1, wherein the first hollow shaft, second hollow shaft and third hollow shaft are releasably attached to each other.

17. The utility cart of claim 1, wherein said utility cart is constructed from metal.

18. The utility cart of claim 1, wherein said utility cart is constructed from plastic.

\* \* \* \* \*